US007802256B2

(12) United States Patent  (10) Patent No.: US 7,802,256 B2
Havens  (45) Date of Patent: Sep. 21, 2010

(54) CLASS SCHEDULER FOR INCREASING THE PROBABILITY OF PROCESSOR ACCESS BY TIME-SENSITIVE PROCESSES

(75) Inventor: Darryl E Havens, Bothell, WA (US)

(73) Assignee: Microsoft Corporation, Redmond, WA (US)

( * ) Notice: Subject to any disclaimer, the term of this patent is extended or adjusted under 35 U.S.C. 154(b) by 1486 days.

(21) Appl. No.: 11/169,071

(22) Filed: Jun. 27, 2005

(65) Prior Publication Data

US 2006/0294522 A1    Dec. 28, 2006

(51) Int. Cl.
  G06F 9/46  (2006.01)
(52) U.S. Cl. .............. 718/103; 718/100; 718/102; 718/107
(58) Field of Classification Search ............ 718/100, 718/102, 103, 107
  See application file for complete search history.

(56) References Cited

U.S. PATENT DOCUMENTS

| | | | |
|---|---|---|---|
| 6,260,150 B1 * | 7/2001 | Diepstraten et al. | 713/323 |
| 6,490,611 B1 * | 12/2002 | Shen et al. | 718/103 |
| 7,036,124 B1 * | 4/2006 | Patterson | 718/104 |
| 2002/0107594 A1 * | 8/2002 | Taylor et al. | 700/94 |
| 2004/0201608 A1 * | 10/2004 | Ma et al. | 345/719 |

\* cited by examiner

*Primary Examiner*—Meng-Ai An
*Assistant Examiner*—Kenneth Tang
(74) *Attorney, Agent, or Firm*—Wolf, Greenfield & Sacks, P.C.

(57) ABSTRACT

A method and apparatus for enabling a general purpose operating system to maximize the probability of time-sensitive threads, e.g., multimedia threads, gaining access to CPU resources quickly enough to meet the demands of time-sensitive tasks while allowing time-insensitive threads to meet the demands of time-insensitive tasks, is disclosed. The priorities of time-sensitive threads in an operating system are adjusted so that the time-sensitive threads have a high probability of gaining access to CPU resources quickly enough to meet the demands of time-sensitive tasks while allowing time-insensitive threads to meet the demands of time-insensitive tasks. A system responsiveness cell (SRC) value is used to determine how quickly the operating system needs to respond to time-sensitive threads and time-insensitive threads. Priorities of threads are dynamically changed according to the relative CPU resource access requirements of system profile tasks. Criteria for mapping time-sensitive tasks are contained in system profile tasks. Priorities of cross-process groups of time-sensitive threads related to specific instances of tasks are adjusted according to the criteria in the system profile tasks. System profile tasks are stored in a system profile which may vary by machine. Priorities of system profile tasks are the regrouped priorities used by the operating system.

16 Claims, 7 Drawing Sheets

| SUB-KEY | FORMAT | VALUE | DEFAULT |
|---|---|---|---|
| BUCKET | STRING | 'HIGH', 'MEDIUM', 'LOW', OR 'LOW-LOW' | LOW |
| PRIORITY | DWORD | RELATIVE BASE PRIORITY TO OTHER TASKS IN SAME BUCKET USING 1 (LOW) TO 8 (HIGH) | 1 |
| CLOCK RATE | DWORD | IN 100NS UNITS | 100,000 |
| GPU PRIORITY | DWORD | 0 - 31 | 8 |
| SFIO PRIORITY | STRING | 'LOW', 'NORMAL', 'HIGH' | NORMAL |
| BACKGROUND ONLY | STRING | TRUE IF THE TASK ONLY RUNS IN THE BACKGROUND; OTHERWISE FALSE | FALSE |
| AFFINITY | DWORD | A BIT MASK INDICATING WHICH PROCESSOR(S) THIS TASK SHOULD RUN ON | 0X00 |

CLASS SCHEDULER FOR INCREASING THE PROBABILITY OF PROCESSOR ACCESS BY TIME-SENSITIVE PROCESSES

FIELD OF THE INVENTION

The present invention relates to computer software, and more particularly, scheduling time-sensitive tasks on computing devices containing general purpose operating systems.

BACKGROUND OF THE INVENTION

A software program (i.e., program) is a set of computer instructions executed by a computing device that directs the operation of the computing device to enable the computing device to provide useful functions. The computer instructions in the program are executed by computing resources provided by the central processing unit (CPU) of the computing device, i.e., CPU resources. Those skilled in the art will appreciate that CPU resources are often provided by, for example, a microprocessor but may be provided by a plurality of microprocessors or by an equivalent device, devices, device set, or device sets.

In a simple computing device, e.g., a digital clock, one program or a small set of interacting programs is sufficient to direct the operation of the computing device. A more complex computing device, e.g., a microwave oven, requires the coordinated activities of a plurality of programs. A common way to coordinate the activities of a plurality of programs executed by a computing device is to use another program to control the programs. A program that is executed by a computing device to coordinate the activities of other programs executed by the computing device is called an operating system. A computing device executes an operating system. An operating system controls programs executed by the computing device.

There are special purpose, i.e., dedicated, operating systems and general purpose operating systems. A dedicated operating system provides a narrow range of functions to a computing device with a bounded and well-defined purpose, e.g., an automatic dishwasher. A general purpose operating system provides a wide range of functions to a computing device with a wide range of purposes, e.g., a desktop computer. Certain dedicated operating systems are more narrowly classified as real-time operating systems. A real-time operating system can be used in applications where the computing device must respond in a limited amount of time and in a predictable way. For example, an avionic guidance system must precisely adjust the control services of a jet aircraft in microseconds to keep the aircraft flying.

While it is true that the CPU resources of a computing device execute the computer instructions in a program, it is more precise to say that the CPU resources execute the computer instructions in an instance of the program, i.e., a program instance. A program instance is to the program from which it was instantiated as a performance of music is to the musical score that is played. More than one instance of a program may be executed by an operating system. For example, three program instances of the same video playback program may be executed by the operating system of one computing device. All three instances of the video playback program may execute the computer instructions of the video playback program but each instance plays a different video clip in a graphical user interface component associated with the specific program instance and the specific video clip. An example of a type of graphical user interface component that may be used to play a video clip is a "window." A window is a bounded portion of a graphical user interface display surface dedicated to a particular application or function.

In an operating system, an instance of a program is referred to as a "process" and the data representing a process is stored in a data structure, e.g., a "process block." A process block contains data structures and pointers to data structures containing data related to the process. In the above example of the three video playback program instances, i.e., processes, there are three process blocks, one each for each process. Among other items, a process contains threads of execution, i.e., threads. When executing, a thread provides one or more of the activities of a process. For example, in a video playback process, one thread may play the video while another thread accepts inputs from user controls. Each thread in a process is represented by a data structure, e.g., a "thread block," that is stored in the process block or pointed to by a pointer in the process block.

A typical computing device appears to execute thousands of threads simultaneously using CPU resources that execute a relatively small number of threads at any one time. The operating system enables a computing device to simulate the simultaneous execution of threads by periodically giving each thread access to CPU resources. The operating system schedules when and for how long each thread uses CPU resources so that each thread can keep up with the demands of the thread's task. Certain threads have higher demands than other threads. For example, a thread that renders image frames of a video clip to a display has higher demands than a thread waiting for incoming e-mail messages. While the e-mail message thread can check for messages every few seconds, the video rendering thread must render each image frame to the display quickly enough to keep the video clip running smoothly. It is critical that the video rendering thread get access to CPU resources quickly and more often than the e-mail thread. The video rendering thread is an example of a time-sensitive thread and the e-mail thread is an example of a time-insensitive thread.

In a general purpose operating system, to increase the probability that the time-sensitive threads get access to CPU resources quickly and more often than time-insensitive threads, time-sensitive threads are given a higher "priority" than time-insensitive threads. A priority is an integer value within a small range of integer values, for example, 0 to 31. Threads that have higher values have higher priority and have a higher probability of getting access to CPU resources quickly and often. The scheme by which an operating system determines priorities is called a priority scheme. In the prior art, priority schemes in most general purpose operating systems work well for threads in most processes; however, threads in multimedia processes, e.g., video playback, often overwhelm priority schemes of general purpose operating systems. For example, if an e-mail process needs to respond to incoming messages while a video playback process is playing a video, the video image may freeze or deteriorate. To avoid such behavior, multimedia processes require a computing device using a general purpose operating system to respond quickly, i.e., imitate the response of real-time operating systems.

In order to achieve performance similar to a real-time operating system and ensure that videos play smoothly, a general purpose operating system may set the priority of video playback processes to a high available level. However, this approach may cause the video playback processes to use CPU resources so often that lower priority processes do not get access to CPU resources quickly enough to keep up with the demands of the tasks of the lower priority processes. For example, if video playback processes are given the highest priority, an e-mail process may be unable to accept incoming messages while videos are playing.

The foregoing discussion demonstrates a clear need to enable a general purpose operating system to ensure that time-sensitive threads, e.g., multimedia threads, have a high probability of gaining access to CPU resources quickly enough to meet the demands of time-sensitive tasks while allowing time-insensitive threads to meet the demands of time-insensitive tasks. The present invention is directed to fulfilling this need.

SUMMARY OF THE INVENTION

In accordance with aspects of the present invention, a method and apparatus, including computer-readable medium, for enabling a general purpose operating system to ensure that time-sensitive threads, e.g., multimedia threads, have a high probability of gaining access to CPU resources quickly enough to meet the demands of time-sensitive tasks while allowing time-insensitive threads to meet the demands of time-insensitive tasks, is provided.

In accordance with one aspect of the invention, the priorities of time-sensitive threads in an operating system are adjusted so that the time-sensitive threads have a high probability of gaining access to CPU resources quickly enough to meet the demands of time-sensitive tasks while allowing time-insensitive threads to meet the demands of time-insensitive tasks.

In accordance with another aspect of the invention, a value is set in a system responsiveness cell (SRC). The SRC value is used to determine how much of the CPU resources are reserved for time-insensitive threads. Conversely, the remaining amount of resources are available for time-sensitive threads.

In accordance with other aspects of the invention, priorities of threads are dynamically changed according to the CPU resource access requirements of system profile tasks. Criteria for mapping time-sensitive processes are contained in system profile tasks. Priorities of time-sensitive threads are adjusted according to the criteria in the system profile tasks. System profile tasks are stored in a system profile.

In accordance with a further aspect of the invention, the priority of threads in a task group may be adjusted such that threads in the task group have the same relative priority at the same time even if the threads are in different processes, i.e. comprise a cross-process group. Further, multiple instances of a task group or groups may be running simultaneously.

In accordance with yet another further aspect of the invention, multiple instances of a system profile task may be created and execute simultaneously. The priorities of the threads associated with each such instance of a system profile task are simultaneously adjusted.

In accordance with further aspects of the invention, the priorities of system profile tasks are the priorities used by the operating system preferably grouped into four groups, i.e., buckets. The priority of the threads are derived from the system profile tasks associated with the threads. The system profile tasks comprise keys and key values and sub-keys and sub-key values to provide criteria for mapping time-sensitive tasks to system profile tasks in the system profile. Preferably, the names of the buckets are: high, medium, low, low-low.

As will be readily appreciated from the foregoing description, the present invention provides a method and apparatus for enabling a general purpose operating system to ensure that time-sensitive threads, e.g., multimedia threads, have a high probability of gaining access to CPU resources quickly enough to meet the demands of time-sensitive tasks while allowing time-insensitive threads to meet the demands of time-insensitive tasks.

BRIEF DESCRIPTION OF THE DRAWINGS

The foregoing aspects and many of the attendant advantages of this invention will become more readily appreciated as the same become better understood by reference to the following detailed description, when taken in conjunction with the accompanying drawings, wherein.

DETAILED DESCRIPTION OF THE PREFERRED EMBODIMENT

Embodiments of the present invention provide a method and apparatus to enable a general purpose operating system to ensure that time-sensitive threads have a high probability of gaining access to CPU resources quickly enough to meet the demands of time-sensitive tasks while allowing time-insensitive threads to meet the demands of time-insensitive tasks. An example of time-sensitive threads are multimedia threads such as, but not limited to, threads for video playback, computer games, and the like. While the present invention is described in the context of multimedia threads, it is to be understood that the invention is not limited to multimedia threads. The invention may also be applied to other kinds of time-sensitive threads. Thus, multimedia threads should be construed as exemplary and not as limiting upon the invention.

The herein described exemplary embodiment of the invention operates within a general purpose operating system such as Microsoft Windows®. An exemplary embodiment of the invention is a Multimedia Class Scheduler Service (MMCSS). The MMCSS is a service that enables an operating system, such as Microsoft Windows, to ensure that multimedia threads have a high probability of gaining access to CPU resources quickly enough to meet the demands of multimedia tasks while allowing time-insensitive threads to meet the demands of time-insensitive tasks. As more fully described below, MMCSS is a process of the operating system containing threads run by CPU resources to provide a set of functions, i.e., a service, to the operating system. The service that MMCSS provides relates to the dynamic adjustment of the scheduling of multimedia threads, i.e., determining how quickly multimedia threads gain access to CPU resources, by dynamically adjusting the priority of multimedia threads.

In an exemplary embodiment of the invention, the priority of a multimedia thread is placed under the control of the MMCSS, controlled by the MMCSS, and released from the control of the MMCSS through the MMCSS's application programming interfaces (APIs). An API is a specification of how to communicate with a software module, e.g., the MMCSS. Among other APIs, MMCSS provides AvSetMmThreadCharacteristics, AvSetMmTheadPriority, and AvRevertMmThreadCharacteristics. AvSetMmThreadCharacteristics is called by a multimedia thread to place the multimedia thread under the control of the MMCSS. AvSetMmTheadPriority is called by the multimedia thread to request a small adjustment of the thread's priority. AvRevertMmThreadCharacteristics is called to release the thread from the control of the MMCSS. One feature of MMCSS APIs is that an identifier that identifies the calling thread is passed to the receiving thread; therefore, when an MMCSS API, such as one of the three aforementioned APIs, is called the MMCSS receives a thread identifier that identifies the calling thread without the calling thread needing to explicitly identify itself. The MMCSS can store the thread identifier for later use.

When a thread calls AvSetMmThreadCharacteristics, the thread submits a task name and a task index to the MMCSS. The task name identifies one of a plurality of system profile tasks stored in the system profile of the MMCSS. The system profile is a set of system profile tasks. A system profile task is a data structure specifying certain task characteristics that effect the computing requirements of threads that execute the task. A task is an instance of a system profile task. The task index identifies the specific instantiation of a task with which a thread is associated. If a thread is starting a new task, the thread submits a task index of zero indicating to the MMCSS that the thread is starting a new task. The MMCSS generates a new task index for a new task, or uses the submitted task index, and returns the task index to the thread. The MMCSS also returns an opaque "handle" that the thread stores and uses later for further communication with the MMCSS. Those skilled in the art will appreciate that a handle is a software mechanism for providing access to software constructs such as, but not limited to, variables and data structures. An opaque handle is a handle with restricted access to the software construct to which it refers. Only certain software mechanisms are permitted to dereference an opaque handle, i.e., use the opaque handle to access the software construct to which the opaque handle refers. Software mechanisms not permitted to dereference an opaque handle are only permitted to pass and receive the opaque handle. The thread also stores the task index. The task index provides the MMCSS with a way to keep track of the threads cooperating to accomplish a common task.

For example, video playback processes have certain computer processing requirements. The processing requirements are described by a video playback system profile task stored in the system profile under the name "Playback." A thread calls AvSetMmThreadCharacteristics and in the call submits the task name "Playback" and task index "0." The MMCSS creates a task with the characteristics described by the "Playback" task profile and a task index identifying the task. The MMCSS returns the opaque handle and task index to the thread. Thereafter, the priority of the video playback thread can be adjusted by the MMCSS to ensure that the video playback thread has a high probability of gaining access to CPU resources quickly enough to meet the demands of the task. If the video playback thread uses other threads or causes new threads to be created and used, the threads use the same task index. Since the video playback thread and the threads the video playback thread uses have the same task index, the MMCSS treats the threads as a group and adjusts the priorities of the threads accordingly.

Within a group of threads cooperating on a task, a thread can request that the thread's own priority be adjusted up or down relative the other threads in the thread's task group. The thread can make this request by calling AvSetMmTheadPriority. In the call, the thread submits the handle and one of four priority adjustment values: Critical, High, Normal, and Low. The MMCSS adjusts the priority of the thread up or down depending on the submitted priority adjustment value. A thread may remove control of the thread's priority from the MMCSS by calling AvRevertMmThreadCharacteristics and in the call submit the handle.

The goal of using the MMCSS as described above is to make the operating system responsive while ensuring that multimedia threads like the video playback threads have a high probability of gaining access to CPU resources quickly enough to meet the demands of the multimedia tasks like the video playback task. In order for the MMCSS to accomplish this goal, the required operating system responsiveness, i.e., system responsiveness, must be specified. The required system responsiveness is specified by a system responsiveness cell (SRC). The SRC is part of the system profile and contains a changeable value that indicates what percentage of time CPU resources should be applied to non-multimedia threads, i.e., threads not controlled by MMCSS. For example, if the SRC value is set to 20, 20% of the time that the computing device is operating, threads not controlled by MMCSS have a high probability of getting access to CPU resources if the threads requite CPU resources. This leaves 80% of the time that the computing device is operating available for threads controlled by MMCSS. Thus, multimedia threads have a high probability of getting access to CPU resources. If threads not controlled by MMCSS have access to CPU resources only 10% of the time, i.e., SRC is set to 10, 90% of the time multimedia threads have a high probability of getting access to CPU resources. Since more frequent access to CPU resources translates into more responsiveness, a higher SRC value, in general, causes the operating system to be more responsive at the expense of less access to CPU resources for multimedia threads.

The exact value of the SRC for a particular combination of computing device and operating system can be determined through experimentation. Thus, the value of 20 should be construed as exemplary and not as limiting upon the invention. In the foregoing examples, the SRC value is set when the operating system is installed on the computing device. Depending on the implementation, the SRC value may be programmable and, thus, settable at other times. Thus, setting the SRC value when the operating system is installed should also be construed as exemplary and not as limiting upon the invention.

Figure 1A:
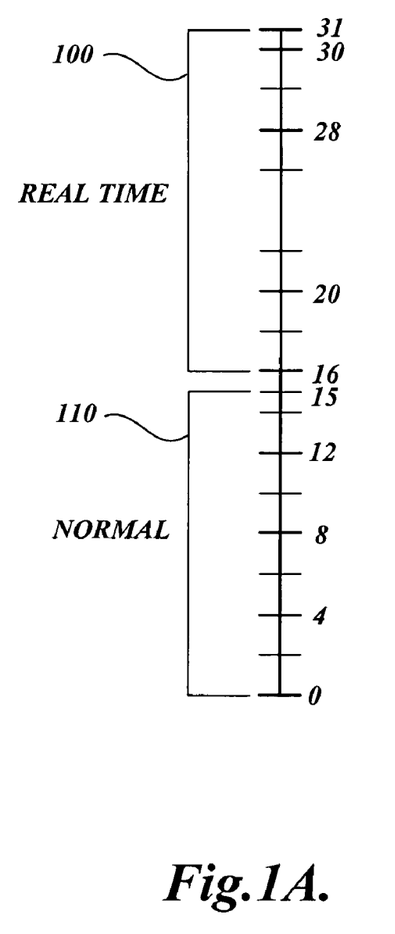
FIG. 1A is a diagram of thread priority values in an exemplary operating system.
Figure 1B:
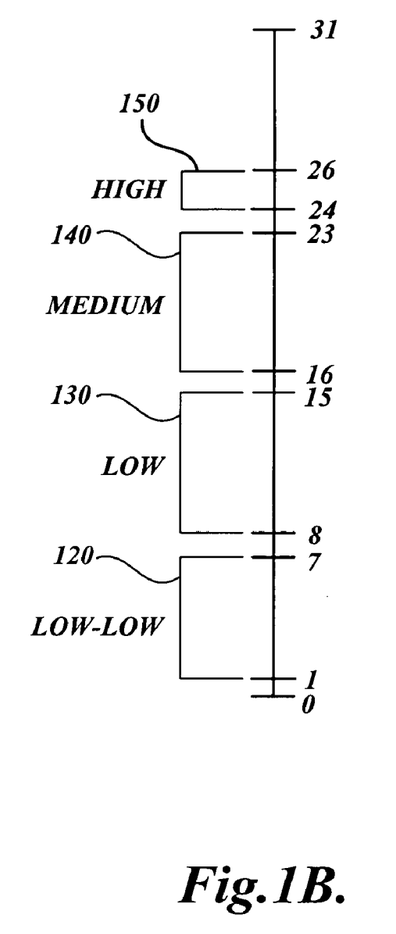
FIG. 1B is a diagram of thread priority values used by an exemplary multimedia class scheduler service.

With an SRC value in place, the MMCSS can adjust the priorities of threads to achieve the desired operating system responsiveness. Each thread in an operating system contains a priority value. The operating system reads the priority and uses the priority to determine in which order a thread should have access to CPU resources. In the herein described exemplary embodiment of the invention, priority values range from 0 to 31. The MMCSS uses the same priority values the operating system assigns to threads but groups the values differently. For example, FIG. 1A is a diagram of thread priority values in an exemplary operating system. It can be seen in FIG. 1A that the priority values are integer values ranging from 0 to 31. It can also be seen that range of priority values is divided into two groups: the real time group 100 and the normal group 110. The priority values in the normal group 110 range from 0 to 15. The priority values in the real time group 100 range from 16 to 31. FIG. 1B shows how MMCSS groups the priority values used by the operating system. By comparing FIG. 1A to FIG. 1B, it can be seen that the same range of priority values, i.e., 0 to 31, that is divided into two groups in FIG. 1A, is divided into five groups in FIG. 1B. The five groups of priority values are: 1 to 7, 8 to 15, 16 to 23, 24 to 26, and 27 to 31. The first four priority value groups are used by the MMCSS. The last priority value group, comprising priority values 27 to 31, is not used by the MMCSS. Therefore, even if a thread is adjusted by MMCSS to the highest priority available to MMCSS, 26, it is possible for other threads to take precedence over the adjusted thread.

The four priority value groups used by the MMCSS are each associated with a "bucket." In FIG. 1B, the lowest bucket is the "low-low" bucket 120 containing values from 1 to 7. The bucket above the low-low bucket is the "low" bucket 130 containing values 8 to 15. The bucket above the low bucket is the "medium" bucket 140 containing values 16 to 23. The bucket above the medium bucket is the "high" bucket 150 containing values 24 to 26.

Figure 2:
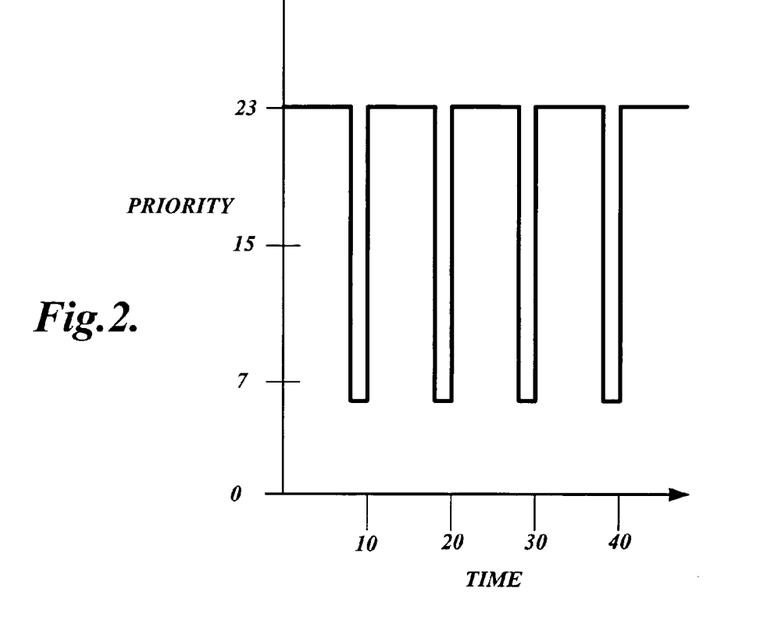
FIG. 2 is a graph of the changes to an exemplary thread's priority over time.

An example of how an exemplary thread's priority changes as it adjusted by the MMCSS over time with an exemplary SRC set to 20 is shown in FIG. 2. The horizontal axis of the graph depicts time divided in 10 millisecond segments. The vertical axis of the graph depicts priority values ranging from 0 to 31. The priority of the exemplary thread shown in FIG. 2 starts with a value of 23. If there are time-insensitive threads needing CPU resources after 8 milliseconds, i.e., 80% of 10 milliseconds, the MMCSS adjusts the priority value of the thread to 6. If there are no time-insensitive threads waiting on CPU resources, the MMCSS will leave the priority value of the thread at 23. After 2 milliseconds, i.e., 20% of 10 milliseconds, the MMCSS changes the priority value back to 23 if the priority value had been moved down to a value of 6. This evaluation of system responsiveness and potential cycling back and forth between priority values continues for as long as the thread is active, i.e., executable, and the thread's priority is under the control of the MMCSS.

The FIG. 2 example of how an exemplary thread's priority changes over time also applies to groups of threads working together. Threads in a specific task group can have their priorities adjusted by the MMCSS such that all threads in the group have the same relative priority at the same time. This grouping of threads is useful if a thread needs to initiate functions provided by another part of the program instance. To help accomplish a task, a thread can use an existing thread or cause another thread to be created and use the newly created thread. For example, a thread playing video may need to create one thread to decode the video, a second thread to paint the video images in the window on the screen, and a third thread to respond to user input. A hierarchy of threads is often assembled from processes in the layers of multimedia components of a operating system. An exemplary hierarchy of threads in exemplary layers of multimedia components of a operating system is shown in FIG. 3.

Figure 3:
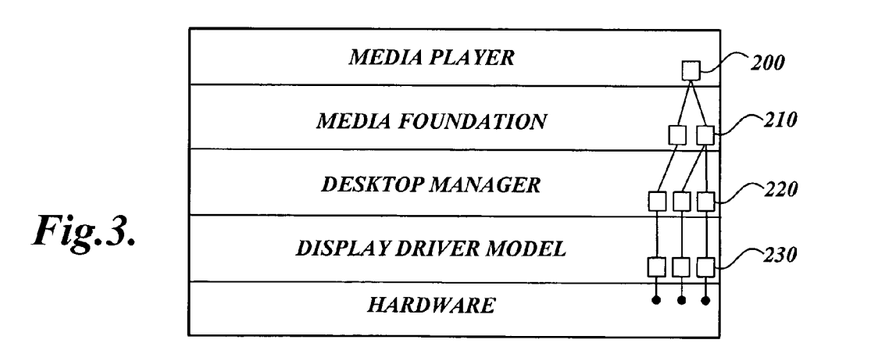
FIG. 3 is a diagram of a hierarchy of threads within the layered multimedia components of an exemplary operating system.

FIG. 3 shows how threads in lower layers provide functions and interact with threads in upper layers to support the functions provided by the upper layer threads. For example, a thread for a video window requires other threads for supporting functions like accessing the video stream and playing the video and so on. FIG. 3 is a diagram showing an exemplary hierarchy of threads in an exemplary hierarchy of layers of software related to playing video. The layers of software are Media Player, Media Foundation, Desktop Manager, Display Driver Model, and hardware. Threads in the Media Player layer provide video windows. Threads in the Media Foundation layer provide access to video streams and decoding of video streams. Threads in the Desktop Manager layer provide functions to place video images on the screen along with images already on the screen. Threads in the Display Driver Model provide direct access to the graphics card, i.e., circuit board containing circuits that compose and render images to displays. A thread 200 for the video window exists in the Media Player layer. A thread 200 in the Media Player layer causes two threads 210 in the Media Foundation layer to be created. The two threads 210 in the Media Foundation layer cause three threads 220 in the Desktop Manager layer to be created. The three threads 220 in the Desktop Manager layer cause three threads 230 in the Display Driver Model layer to be created. The threads in the Display Driver Model layer interact directly with the graphics card to perform the functions requested by the video window thread. The number and kinds of software components, software component layers, and threads shown in FIG. 3 should be construed as exemplary and not as limiting upon the invention.

In this regard, as will be readily appreciated by those skilled in the art, multiple instances of a system profile task may be created and execute simultaneously. The priorities of the threads associated with each such instance of the system profile task will be simultaneously adjusted. Simultaneously adjusting the priorities of the threads of multiple instances of the same system profile task can be demonstrated with the following example. Imagine three windows playing video clips, i.e., video windows. Because each is a video window, each is associated with a separate instantiation of the same system profile task, e.g., Playback. Only one of video windows can have focus. If another video window is selected, that video window receives focus. The priorities of the group of threads associated with the system profile task instantiation of the newly focused video window are adjusted up as a group and the priorities of the group of threads associated with the system profile task instantiation of the previously focused video window are adjusted down as a group. The priorities of the group of threads associated with the system profile task instantiation of the video window that did not receive focus are unchanged. Thus, references in the foregoing description to single instances of system profile tasks should be construed as exemplary and not limiting.

Figure 4:
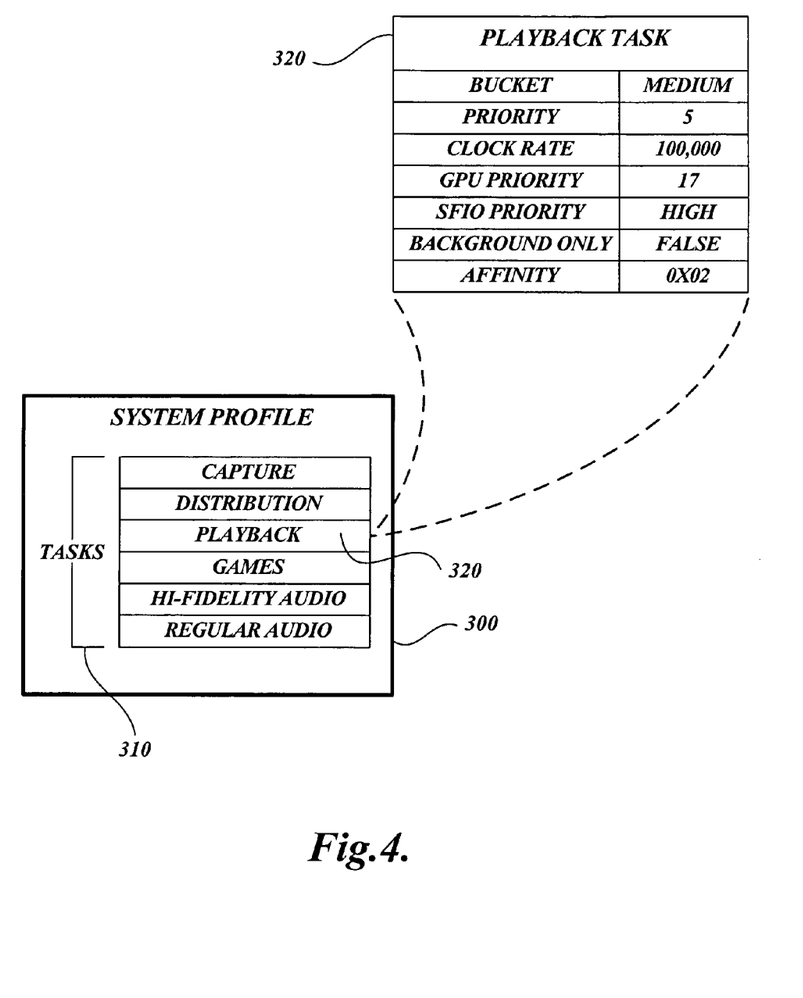
FIG. 4 is a block diagram of an exemplary system profile containing exemplary system profile tasks.

The MMCSS uses a policy to decide how to adjust the priorities of multimedia threads. The policy the MMCSS uses to adjust the priorities of multimedia threads is encoded in the MMCSS system profile, i.e., the set of system profile tasks mentioned earlier. The system profile specifies the types of tasks that the MMCSS recognizes. Each system profile task specification contains parameters used to determine the priority of the task. FIG. 4 shows an exemplary system profile 300 containing exemplary system profile tasks 310. The system profile tasks in the system profile 300 are Capture, Distribution, Playback, Games, Hi-fidelity Audio, and Regular Audio. Each system profile task has a system profile task key, i.e., a task key. For example, the Capture system profile task has a task key named "Capture." The task name submitted in certain MMCSS APIs is the task key.

Figure 5:
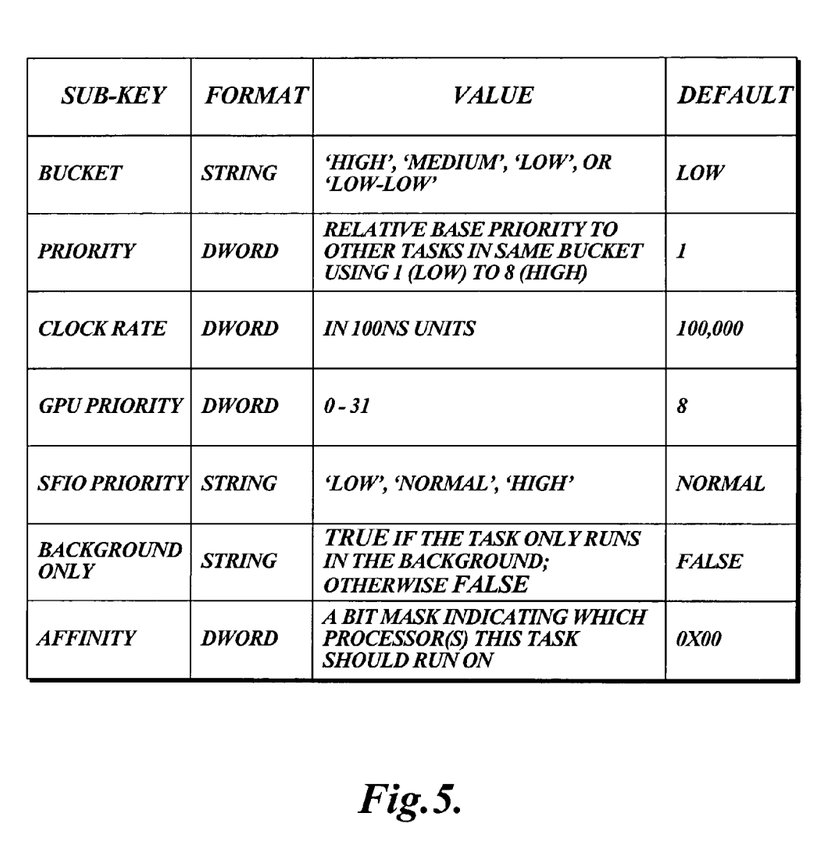
FIG. 5 is a chart of sub-keys used in system profile tasks.

Each system profile task has the same data structure specification, i.e., the system profile task data structure specification. A system profile task data structure contains parameters used to determine the priority of the task. The parameter values in a system profile task are referenced using sub-keys. FIG. 5 is a chart of the sub-keys, i.e., parameters, in system profile tasks. Each sub-key has a format, a range of values, and a default value. The sub-keys in the herein described exemplary embodiment of the invention illustrated in FIG. 5 are: Bucket, Priority, Clock Rate, GPU (Graphic Processing Unit) Priority, SFIO (Scheduled File Input and Output) Priority, Background Only, and Affinity.

The Bucket sub-key has a string format and set of high, medium, low, and low-low values. The Bucket sub-key has a default value of low. The Priority sub-key has a double word format and a range of values that define a relative base priority to other tasks in the same bucket using 1 (low) through 8 (high). The default value of the Priority sub-key is 1. The Clock Rate sub-key has a double word format and a range of values in 100 ns units. The default value of the Clock Rate sub-key is 100,000: The GPU Priority sub-key has a double word format, a range of values from 0 to 31, and a default value of 8. The SFIO Priority sub-key has a string format and low, normal, and high values. The SFIO priority has a default value of normal. The Background Only sub-key has a string format and is true if the task only runs in the background; otherwise it is false. The default value of the Background Only sub-key is false. The Affinity sub-key has a double word format and is a bit mask indicating which processors this task should run on. The default value of the Affinity sub-key is 0X00.

FIG. 4 includes a sub-key example for the Playback task key 320. Playback, i.e., video playback, is referenced using the "Playback" task key 320. The Playback task key 320 contains sub-key parameter values that parameterize video playback processes. The exemplary parameters illustrated in FIG. 4 are: Bucket value medium; Priority value 5; Clock Rate value 100,000; GPU (Graphic Processing Unit) Priority value 17; Schedule File Input and Output (SFIO) Priority value high; Background Only value false; and Affinity value 0X02. Parameter values are accessed using the sub-keys.

Of the sub-keys shown in FIG. 5, the three sub-keys of most interest are the Bucket, Priority, and Background Only sub-keys. The value referenced using the Bucket sub-key is the bucket that contains the threads of a task. A Bucket value of "high" indicates that threads of a task can have a priority value immediately below the priority values of essential operating system threads, i.e., below 26. A Bucket value of "medium" indicates that threads in a task are time-sensitive, e.g., multimedia threads. A Bucket value of "low" indicates that threads in a task are still to be managed by the MMCSS but at a normal priority. This may be the case where commonly defined tasks are not important for the current implementation, for example, with gaming tasks on a personal computer configured for business applications.

The value accessed using the Priority sub-key is a relative priority, a way of ranking threads in the same bucket against each other by task. If there are a number of threads from various tasks in the "medium" bucket, it may be preferable that threads of each task have a different priority so that not all of the threads in the "medium" bucket have equal access to CPU resources. Threads with a relative priority of 1 have the lowest priority and threads with a relative priority of 8 have the highest priority. For example, the tasks of the threads in the "medium" bucket are "Capture," "Playback," and "Games." The task of the "Capture" threads may be capturing the video stream from a video camera shooting live video. The task of the "Playback" threads may be playing back a movie to the screen. The task of the "Games" threads may be playing a fast-paced 3D car racing game. The relative priority of the threads of the "Capture" task is 8 because video capture can be very demanding and any late access to CPU resources may mean data is lost permanently (within the local context). The relative priority of the threads of the "Games" task is 6 because the game player needs bursts of CPU time and may not notice problems of short duration. The relative priority of the threads of the "Playback" task is 5 because most viewers will not notice some dropped frames and the playback rate is predictable.

Figure 7A:
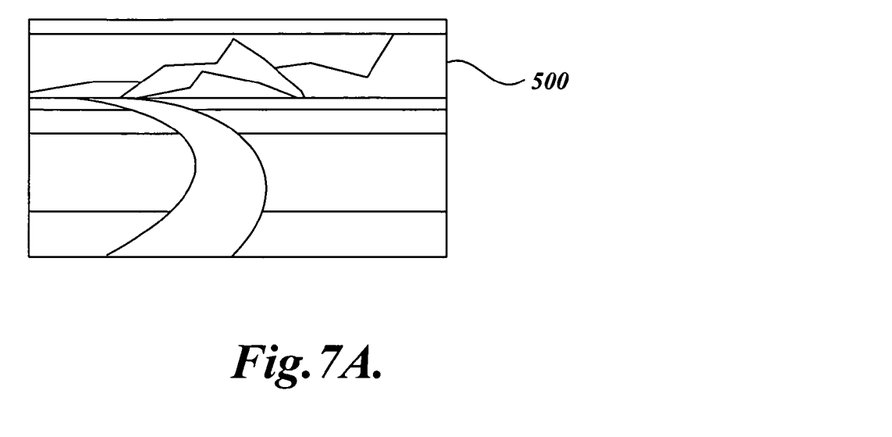
FIG. 7A is a picture of an exemplary window playing a video clip.
Figure 7B:
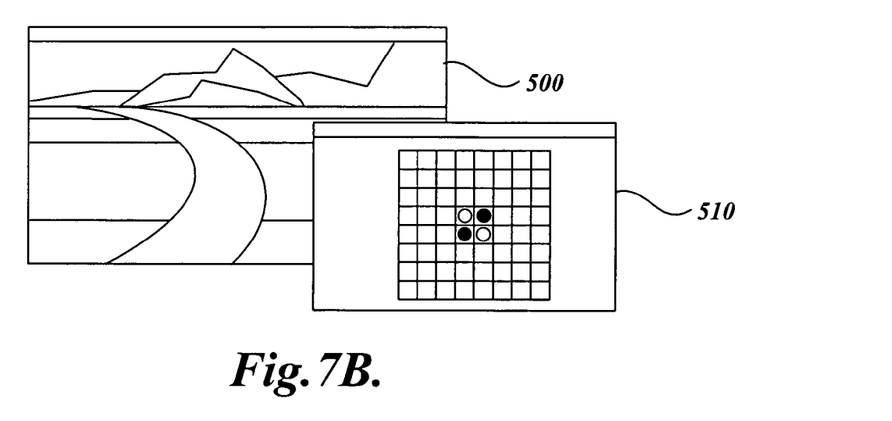
FIG. 7B is a picture of an exemplary window representing a computer game which has gained the focus from an exemplary window playing a video clip.
Figure 7C:
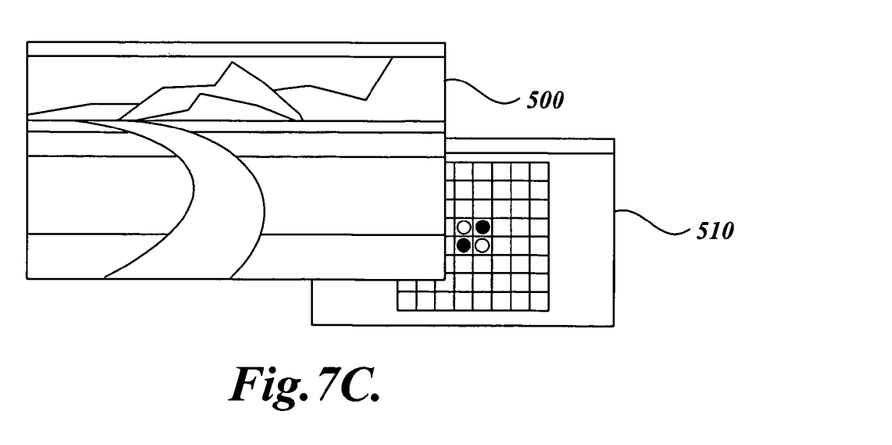
FIG. 7C is a picture of an exemplary window playing a video clip which has gained the focus from an exemplary window presenting a computer game.

To understand the function of the Background Only sub-key, one must understand the concept of focus as applied to windows on a display of a computing device, e.g., a screen of a desktop computer. A user may interact with one element at a time in the user interface presented on the screen of a desktop computer. The element, e.g., a window, with which the user interacts is said to have "focus" or "the focus." The element with the focus is placed in the visual foreground so that the window appears to be in front of other elements on the screen. For example, a user selects a window playing a video. The window playing the video, i.e., the video window, visually overlaps other elements on the screen so that none of the video window is obscured. FIGS. 7A, 7B, and 7C show a sequence in which a video window loses focus to a game window and regains focus. FIG. 7A is a picture of an exemplary video window 500 with no other visual elements on the screen. Since there are no other visual elements, the video window 500 has the focus. FIG. 7B is a picture of an exemplary window presenting a computer game, i.e., a game window 510, which has gained the focus from the video window and is in the visual foreground. The video window 500 is in the background behind the game window 510 because the game window 510 has gained the focus from the video window 500. FIG. 7C is a picture of the video window that has regained the focus from the game window. It can be seen in FIG. 7C that the video window 500 is now in front of the game window 510 because the video window 500 has gained the focus from the game window 510. The screens and screen elements in the aforementioned description are exemplary and should not be construed as limiting upon the invention.

The value accessed using the Background Only sub-key can be true or false. If the Background Only value is true, the task is assigned whatever priority the task would have if it were in focus. If the Background Only value is false, the task is assigned a priority based on whether or not the window or windows associated with the task receive focus. The Background Only value of a task should only be set to true if no window is associated with the task or, possibly, the window or windows that are associated with the task never receive the focus, i.e. never come to the foreground.

The following is a description of how the MMCSS uses the SRC, priorities, and buckets to make the operating system responsive ensuring that multimedia threads have a high probability of gaining access to CPU resources quickly enough to meet the demands of multimedia tasks. It should be kept in mind that the MMCSS is itself a thread. Threads have states such as, but not limited to, ready, running, and waiting. A thread in the ready state is ready to run but is not yet running. A thread in the running state is being executed by CPU resources. A thread in the waiting state is not running and is not ready to run. The MMCSS enters the running state, i.e., runs, periodically to determine if there are threads not registered with the MMCSS in the ready state. The SRC value is used by the MMCSS to determine the period of time between each run of the MMCSS. Using the exemplary SRC value of 20 and the total cycle time of 10 milliseconds as illustrated in FIG. 2, the MMCSS runs at 8 millisecond and 2 millisecond intervals. When the MMCSS runs after 8 milliseconds, the MMCSS determines if threads not being managed by the MMCSS are waiting to execute. If there are, the MMCSS-managed threads (other than those in the High bucket) are moved to the Low-Low bucket. After sleeping for 2 milliseconds and then running, the MMCSS moves the threads in the low-low bucket back to the bucket indicated in the bucket value contained in the system task for the process containing the threads, taking current focus into account.

An exemplary method for approximately determining if threads not being managed by the MMCSS are waiting to execute involves the "idle thread," i.e., the thread an operating system executes if there are no other threads ready to execute. MMCSS checks to see if the idle thread has run. If the idle thread has run during the previous period, it can be assumed that all threads at some point had as much access to CPU resources as needed and that there is no need to lower the priorities of the threads managed by MMCSS.

Figure 6:
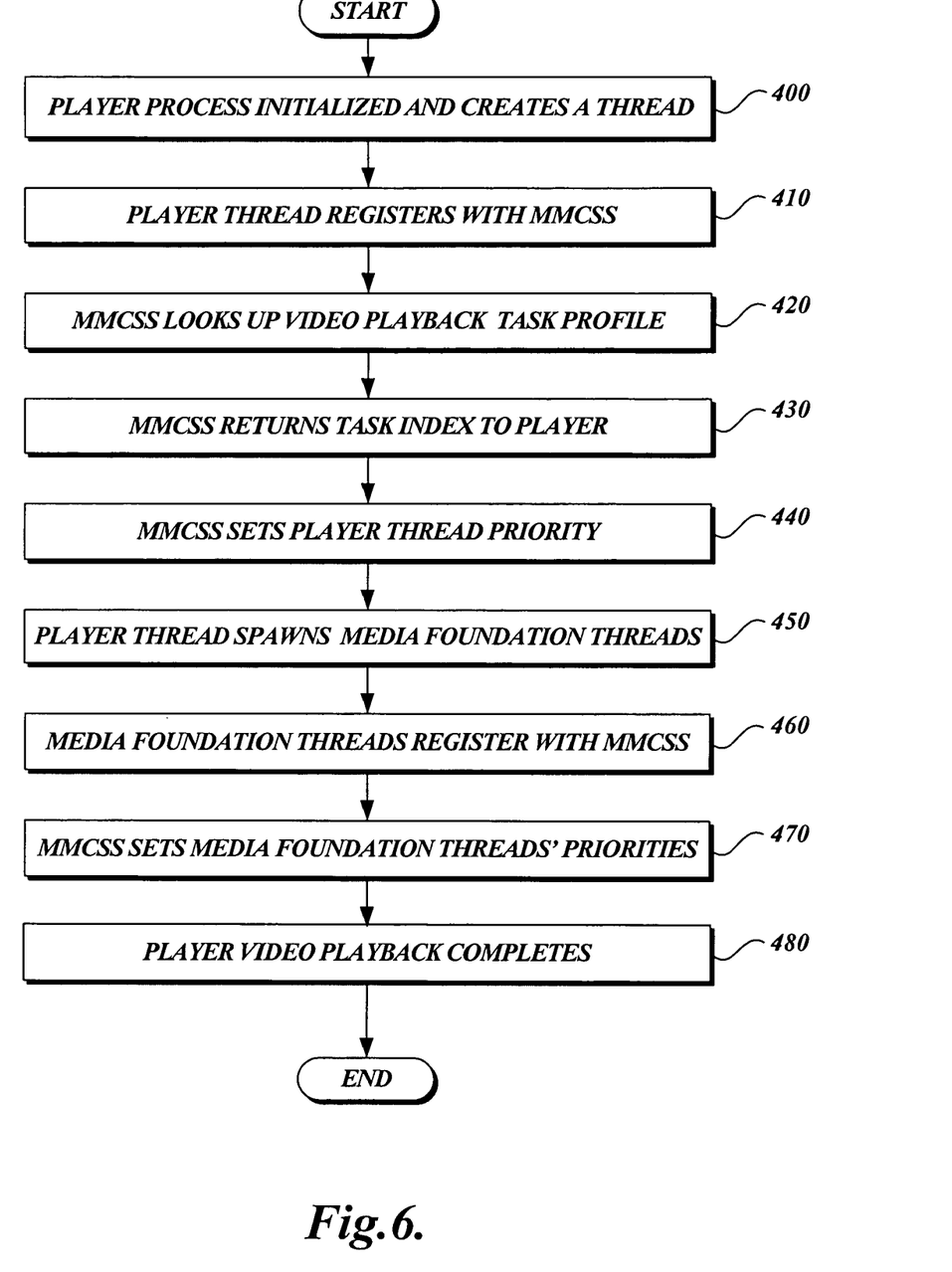
FIG. 6 is a flow chart showing how a multimedia class scheduler service manipulates the priorities of time-sensitive threads.

FIG. 6 is a flow chart showing how an MMCSS adjusts the priorities of multimedia threads in order to ensure that multimedia threads have a high probability of gaining access to CPU resources quickly enough to meet the demands of multimedia tasks. At block 400, a video player process starts. The video player process requires threads to perform functions like retrieving a video source, decoding the video source into renderable images, and rendering video images into a window on the screen. The video player process starts a thread in the Media Player software layer to manage the required threads. At block 410, the Media Player thread registers with MMCSS. Specifically in the herein described example of the invention the Media Player thread calls AvSetMmThreadCharacteristics, with a task index value of 0, to start a new Playback system profile task. At block 420, the MMCSS finds the Playback system profile task in order to use information in the Playback system profile task to adjust the priority of threads in the Media Player's system profile task. The MMCSS takes control of the Media Player thread's priority. At block 430, the MMCSS returns the task index to the Media Player thread. At block 440, the MMCSS sets the priority of the Media Player thread. For example, if the base priority of the Media Player thread is 20 and the application has focus, the priority of the Media Player thread is initially set to 20. Since the bucket for Playback system profile tasks is medium, the Media Player thread is placed in the medium bucket.

At block 450, the Media Player thread causes threads in the Media Foundation Layer to be created. The Media Player thread passes the task index to the threads in the Media Foundation layer. At block 460, the threads in the Media Foundation layer register with the MMCSS by calling AvSetMmThreadCharacteristics with the task index. Activities similar to those in blocks 450 and 460 are repeated for threads in the Desktop Manager Layer and the Display Driver Model Layer. At block 470 the MMCSS sets the priorities of the threads registered as members of the Media Player task. At block 480, the Media Player playback completes, i.e., the Media Player thread and related threads complete. When the threads complete, the Media Player thread and related threads unregister from the MMCSS. The operating system then cleans up the Media Player process.

During the operation of the Media Player task in the aforementioned description, a thread, for example the Media Player thread, may contain computer instructions that enable the Media Player thread to determine when the Media Player thread requires a higher priority value than the priority value in the system profile task. To increase the priority for the Media Player thread, the Media Player thread calls AvSetMmThreadPriority to increase the Media Player thread's priority relative to the priority value in the system profile task and hence, other threads in the Media Player thread's task. A thread may call AvSetMmThreadPriority with one of four Priority argument values: Critical, High, Normal, and Low. A value of Critical adds two to the priority of the system profile task; a value of High adds one; a value of Normal adds nothing; and a value of Low subtracts one from the priority of the system profile task. For example, the Media Player thread calls AvSetMmThreadPriority on MMCSS with a value of Critical. This makes the effective priority of the Media Player thread 22, i.e., 20 plus 2.

Note that a thread with a base priority value in the medium range is placed in the medium bucket, i.e., assigned an priority value in the medium bucket, only when the process that contains the thread has the focus, i.e., is in the foreground or has Background-Only set to true. In the aforementioned description, if the window for the Media Player process yielded the focus to another window, the priority of the Media Player thread and the priorities of the child threads associated with the Media Player thread would be set to a value in the low bucket, for example, 12. Threads in the medium bucket are allowed 100% access to CPU resources subject to the limitations cited below. The low bucket contains threads not using the MMCSS. Such threads perform as if there were no MMCSS in the operating system. Threads in the low bucket are guaranteed a minimum percentage of access to CPU resources if necessary. For example, if the SRC value is 20, threads in the low bucket are guaranteed access to CPU resources up to 20% of the time. If the threads in the low bucket require access to CPU resources for less than 20% of the time, the threads in the medium bucket may have access to CPU resources during the unused portion of the 20% of the time. For example, if threads in the low bucket access CPU resources only 5% of the time, the threads in the medium bucket are allowed to access CPU resources 95% of the time. A thread from the medium bucket is moved into the low-low bucket if the thread has accessed the CPU resources for 80% of the time. Such threads continue to run if no threads in the low bucket are running.

Figure 8:
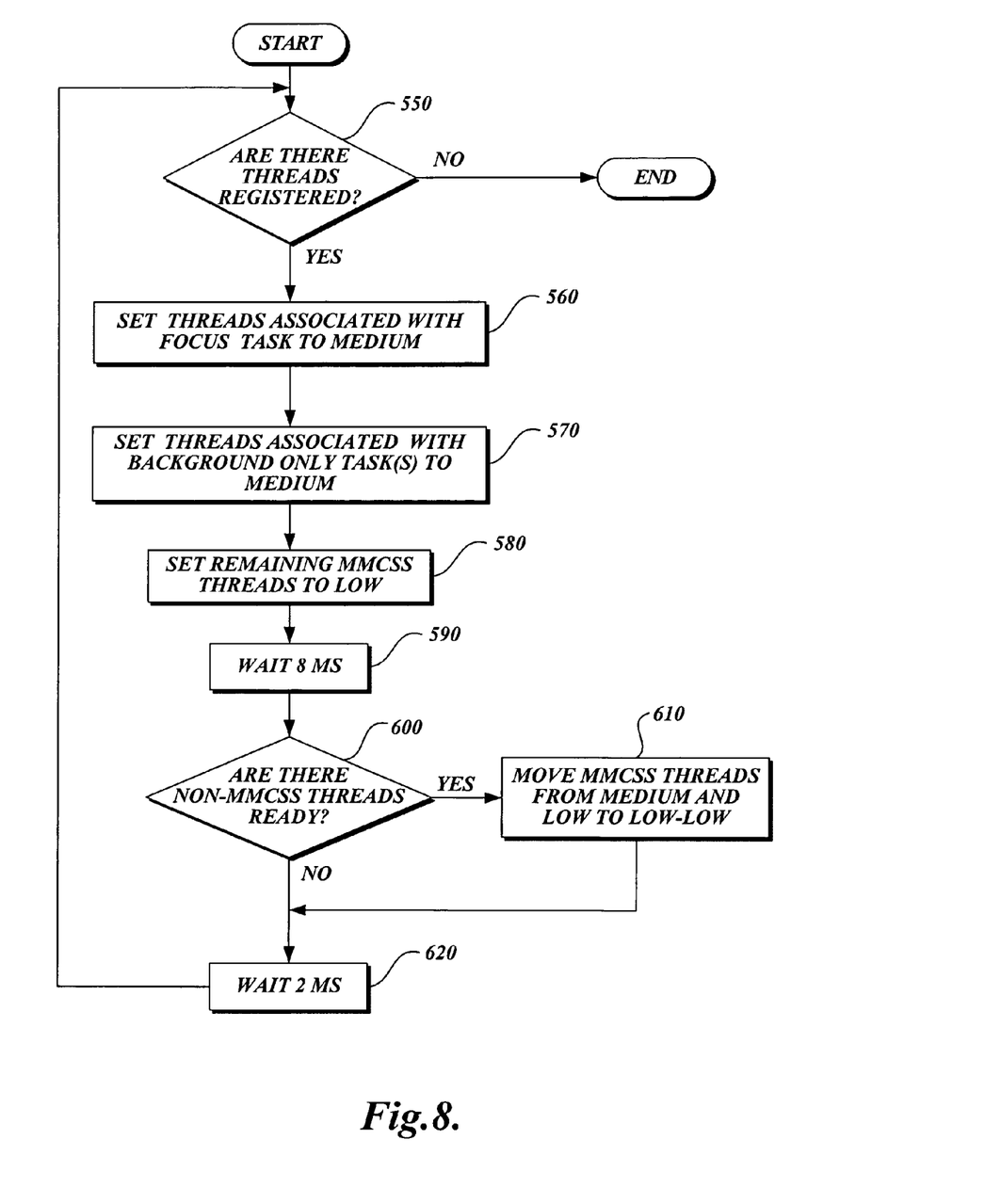
FIG. 8 is a flow chart showing how thread priorities change in response to windows gaining and losing focus.

The flow chart in FIG. 8 shows how the MMCSS changes thread priorities in response to windows gaining and losing focus. At block 550, the MMCSS is in the running state and determines if there are registered threads. If there are no registered threads, the flow ends. If there are registered threads, at block 560, the MMCSS sets threads associated with a task that has a focus window to Medium, i.e., places threads associated with a task that has a focus window in the Medium bucket. At block 570, the MMCSS sets threads associated with Background Only task(s) to Medium. At block 580, the MMCSS sets remaining threads to Low. At block 590, the MMCSS, waits 8 milliseconds, i.e., enters the wait state and remains there for 8 milliseconds. At block 600, the MMCSS enters the running state and determines if there are non-MMCSS threads waiting, i.e., threads not registered with the MMCSS that are in the ready state. If there are threads not registered with the MMCSS, i.e., unregistered threads, that are in the ready state, at block 610, the MMCSS moves MMCSS threads, i.e., registered threads, from Medium and Low to Low-Low. If there are no unregistered threads, the flow moves to block 620. At block 620, the MMCSS waits 2 milliseconds, i.e., enters the wait state and remains there for 2 milliseconds. After 2 milliseconds, the MMCSS enters the running state and the flow returns to block 550.

While the preferred embodiment of the invention has been illustrated and described, it will be appreciated that various changes can be made therein without departing from the spirit and scope of the invention as defined by the appended claims. For example, an embodiment of the invention may be used to enable an operating system to designate threads other than multimedia threads to be time-sensitive.

The embodiments of the invention in which an exclusive property or privilege is claimed are defined as follows:

1. A method of setting priorities of threads of time-sensitive tasks and time-insensitive tasks, said method comprising:
   (a) assigning priorities to the threads of said time-sensitive tasks according to criteria defined by system profile tasks;
   (b) using a system responsiveness cell (SRC) value to indicate a percentage of time processor resources should be applied to the threads of said time-sensitive tasks or to the threads of said time-insensitive tasks;
   (c) dynamically adjusting the priorities of the threads of said time-sensitive tasks according to the priorities of said system profile tasks even if the threads are in different tasks;
   further comprising:
   (d) mapping the time-sensitive tasks to the system profile tasks,
   wherein the time-sensitive tasks comprise a multimedia task;
   wherein dynamically adjusting the priorities of the threads of said time-sensitive tasks according to the priorities of said system profile tasks comprises, during a first time period, assigning priorities of the threads of said time-sensitive tasks to a first priority level, and, during a second time period, assigning priorities of the threads of said time-sensitive tasks to a second priority level,
   wherein
   the second priority level has a lower priority than the first priority level, and
   a cycle time comprises the first and second time period, and the SRC value indicates the percentage of the cycle time that the first time period or the second time period makes up.

2. The method of claim 1 wherein each of said system profile tasks includes a plurality of sub-keys for indicating properties of the respective system profile task.

3. The method of claim 2 wherein said plurality of sub-keys include a bucket sub-key for indicating, at least in part, the priority of the system profile task, wherein the bucket sub-key indicates one of a plurality of bucket values, the bucket values having relative priorities with respect to one another.

4. The method of claim 3 wherein the plurality of bucket values include high, medium, low, and low-low.

5. The method of claim 3 wherein said plurality of sub-keys include a priority sub-key for indicating the relative priority of the system profile task among system profile tasks having the same bucket value for the bucket sub-key as the system profile task.

6. The method of claim 2 wherein said plurality of sub-keys include a background sub-key that determines if an associated system task must remain in the background of a display or if a related system task can become a focus window of the display.

7. The method of claim 1 wherein the priorities of system profile tasks are separated into a plurality of buckets and wherein a relative base value ranks threads in the same bucket against each other based on the system profile task associated with the threads.

8. The method of claim 1 wherein said system profile tasks include multiple instances and wherein:
   (a) said multiple instances execute simultaneously; and
   (b) the priorities of the threads associated with each of said multiple instances are simultaneously adjusted.

9. A computer storage medium, including computer-executable instructions that, when executed, cause a computing device to:
   (a) assign priorities to the threads of time-sensitive tasks according to criteria defined by said system profile tasks;
   (b) use a system responsiveness cell (SRC) value to indicate a percentage of time processor resources should be applied to the threads of said time-sensitive tasks or to the threads of said time-insensitive tasks;
   (c) dynamically adjust the priorities of the threads of said time-sensitive tasks according to the priorities of said system profile tasks even if the threads are in different tasks;
   further causing the computing device to:
   (d) mapping the time-sensitive tasks to the system profile tasks,
   wherein the time-sensitive tasks comprise a multimedia task,
   wherein causing the computing device to dynamically adjust the priorities of the threads of said time-sensitive tasks according to the priorities of said system profile tasks comprises:
   during a first time period, assigning priorities of the threads of said time-sensitive tasks to a first priority level;
   during a second time period, assigning priorities of the threads of said time-sensitive tasks to a second priority level, wherein the second priority level has a lower priority than the first priority level; and
   wherein a cycle time comprises the first and second time period, and the SRC value indicates the percentage of the cycle time that the first time period or the second time period makes up.

10. Computer storage medium as claimed in claim 9 wherein said bucket values include high, medium, low, and low-low.

11. Computer storage medium as claimed in claim 9 wherein said system profile tasks include sub-keys that have values, said values providing criteria for mapping time-sensitive tasks to system profile tasks.

12. Computer storage medium as claimed in claim 11 wherein said plurality of sub-keys include a bucket sub-key for indicating, at least in part, the priority of a system profile task, wherein the bucket sub-key indicates one of a plurality of bucket values, the bucket values having relative priorities with respect to one another.

13. Computer storage medium as claimed in claim 12 wherein said plurality of sub-keys include a priority sub-key for indicating the relative priority of the system profile task among system profile tasks having the same bucket value for the bucket sub-key as the system profile task.

14. Computer storage medium as claimed in claim 11 wherein said plurality of sub-keys include a background sub-key that determines if an associated system task must remain in the background of a display or if a related system task can become a focus window of the display.

15. Computer storage medium as claimed in claim 9 wherein the priorities of system profile tasks are separated into a plurality of buckets and wherein a relative base value ranks threads in the same bucket against each other based on the system profile task associated with the threads.

16. A computer storage medium comprising computer-executable instructions that, when executed by a computer, perform a method of setting priorities of threads of time-sensitive tasks and time-insensitive tasks, said method comprising:
   (a) mapping time-sensitive tasks to system profile tasks;
   (b) assigning priorities to the threads of said time-sensitive tasks according to criteria defined by system profile tasks;

(c) using a system responsiveness cell (SRC) value to indicate a percentage of time processor resources should be applied to the threads of said time-sensitive tasks or to the threads of said time-insensitive tasks; and (d) dynamically adjusting the priorities of the threads of said time-sensitive tasks according to the priorities of said system profile tasks by, during a first time period, assigning priorities of the threads of said time-sensitive tasks to a first priority level, and, during a second time period, assigning priorities of the threads of said time-sensitive tasks to a second priority level, wherein the second priority level has a lower priority than the first priority level, wherein the relative duration of the first time period and the second time period is determined by the SRC value; and (e) mapping the time-sensitive tasks to the system profile tasks, wherein the time-sensitive tasks comprise a multimedia task.

* * * * *